United States Patent [19]
Otobe

[11] Patent Number: 5,917,634
[45] Date of Patent: Jun. 29, 1999

[54] OPTICAL-SIGNAL TRANSMITTING APPARATUS, OPTICAL-SIGNAL RECEIVING APPARATUS, AND OPTICAL-SIGNAL TRANSMITTING AND RECEIVING SYSTEM

[75] Inventor: Takashi Otobe, Kanagawa, Japan

[73] Assignee: Sony Corporation, Tokyo, Japan

[21] Appl. No.: 08/622,093

[22] Filed: Mar. 26, 1996

[30] Foreign Application Priority Data

Mar. 27, 1995 [JP] Japan ..................................... 7-067805
Mar. 18, 1996 [JP] Japan ..................................... 8-060493

[51] Int. Cl.$^6$ .................................................. H04B 10/00
[52] U.S. Cl. ........................... 359/172; 359/127; 250/574
[58] Field of Search .................................... 359/152, 121, 359/172, 178, 159, 170, 171, 127, 130, 131; 250/214 A, 574, 575

[56] References Cited

U.S. PATENT DOCUMENTS

| | | | |
|---|---|---|---|
| 3,963,347 | 6/1976 | Segre et al. ................................. | 372/20 |
| 4,358,858 | 11/1982 | Tamura et al. ........................... | 359/172 |
| 4,867,560 | 9/1989 | Kunitsugu ................................ | 359/172 |
| 5,107,509 | 4/1992 | Esterowitz et al. ....................... | 372/20 |
| 5,335,361 | 8/1994 | Ghaem ..................................... | 359/152 |
| 5,390,040 | 2/1995 | Mayeux ................................... | 359/152 |
| 5,424,859 | 6/1995 | Uhera et al. ............................. | 359/152 |
| 5,457,561 | 10/1995 | Taneya et al. ........................... | 359/172 |
| 5,724,168 | 3/1998 | Oschmann et al. ...................... | 359/172 |
| 5,726,786 | 3/1998 | Heflinger ................................. | 359/152 |
| 5,774,247 | 6/1998 | Taglione et al. ......................... | 359/152 |

FOREIGN PATENT DOCUMENTS

| | | | |
|---|---|---|---|
| 0338789 | 10/1989 | European Pat. Off. ............... | 359/172 |
| 0070899 | 3/1989 | Japan ..................................... | 359/172 |

*Primary Examiner*—Rafael Bacares
*Attorney, Agent, or Firm*—Limbach & Limbach L.L.P.

[57] ABSTRACT

An optical-signal transmitting apparatus performs predetermined digital modulation on a digital signal to be transmitted. The modulated digital signal is then converted into a light signal which is output. The output light signal is scattered and radiated to external space. The wavelength of the radiated light is preferably between 1.4 and 1.6 microns. Modulation is preferably performed based on a duration of a symbol to obtain not less than a predetermined ratio, e.g., 3, of a carrier wave to an interference wave. The scattered light signal is received and is preferably converged by a hemispherical lens mounted to a light receiving device. The received light signal is converted to an electrical signal and digital demodulation is performed.

36 Claims, 12 Drawing Sheets

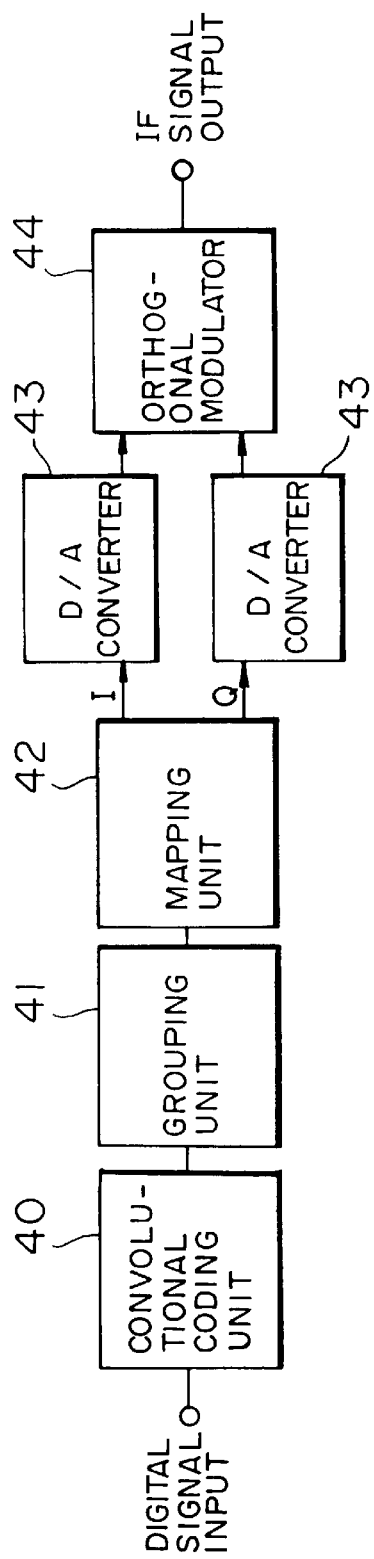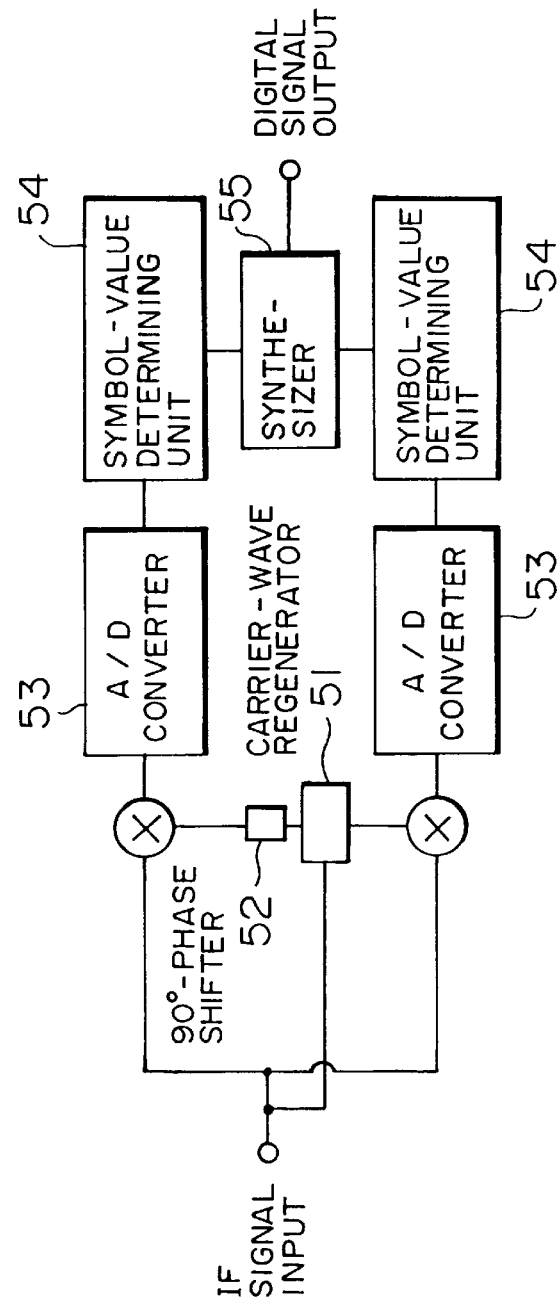

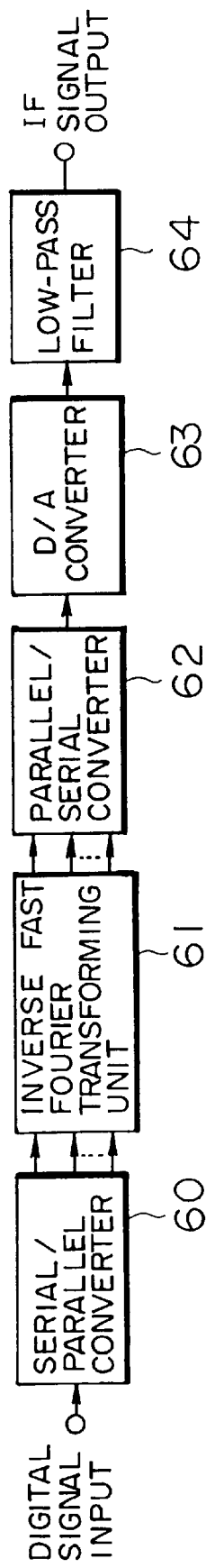
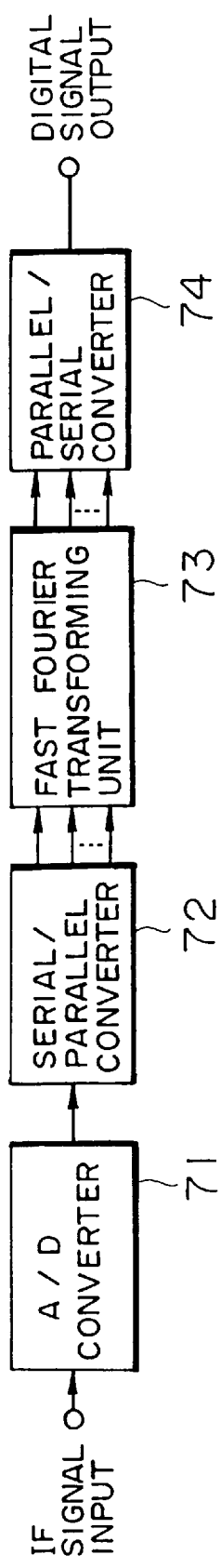
FIG. 8A
FIG. 8B

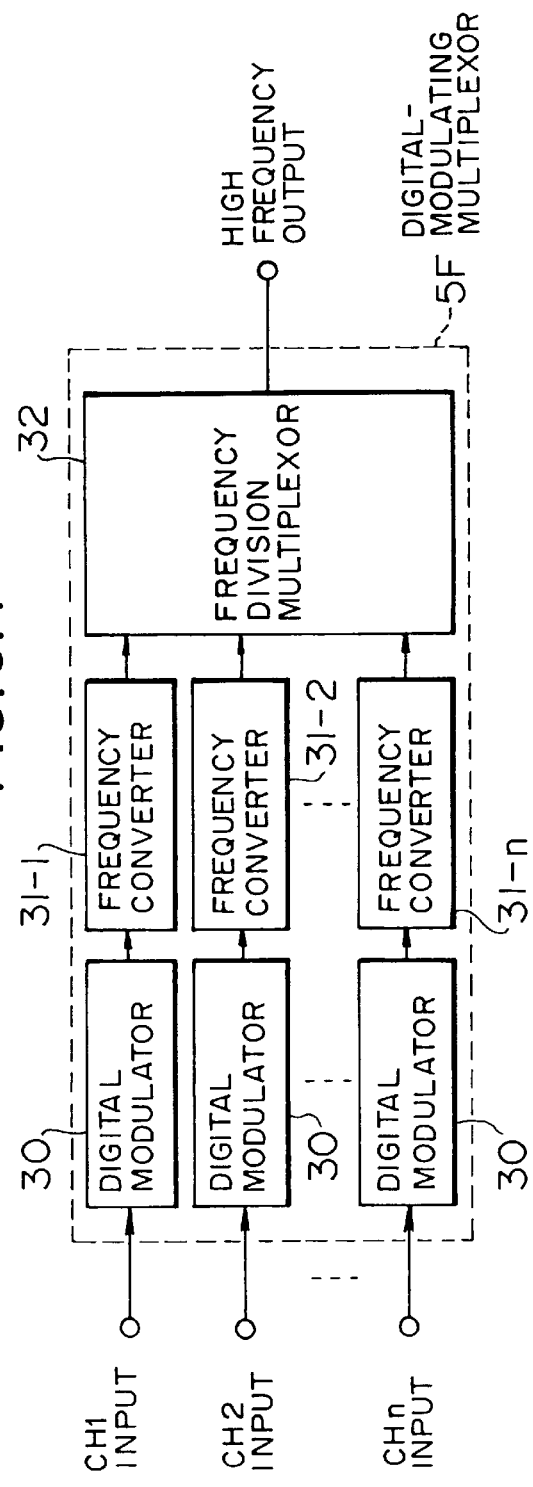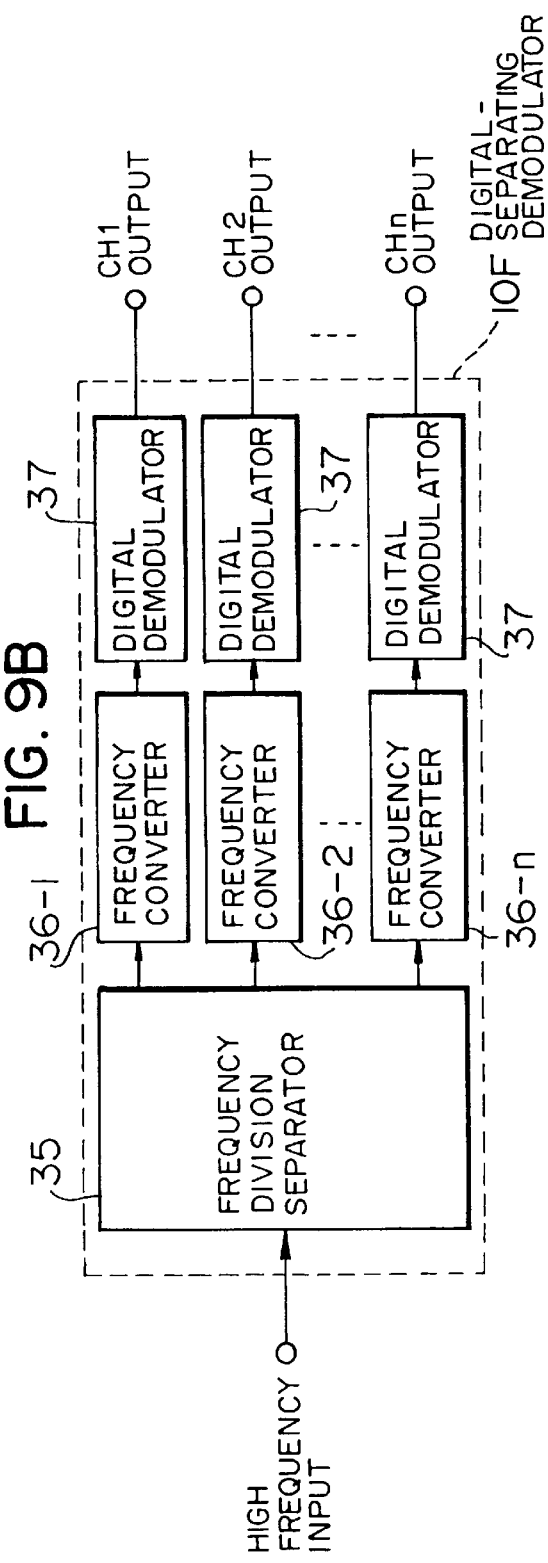

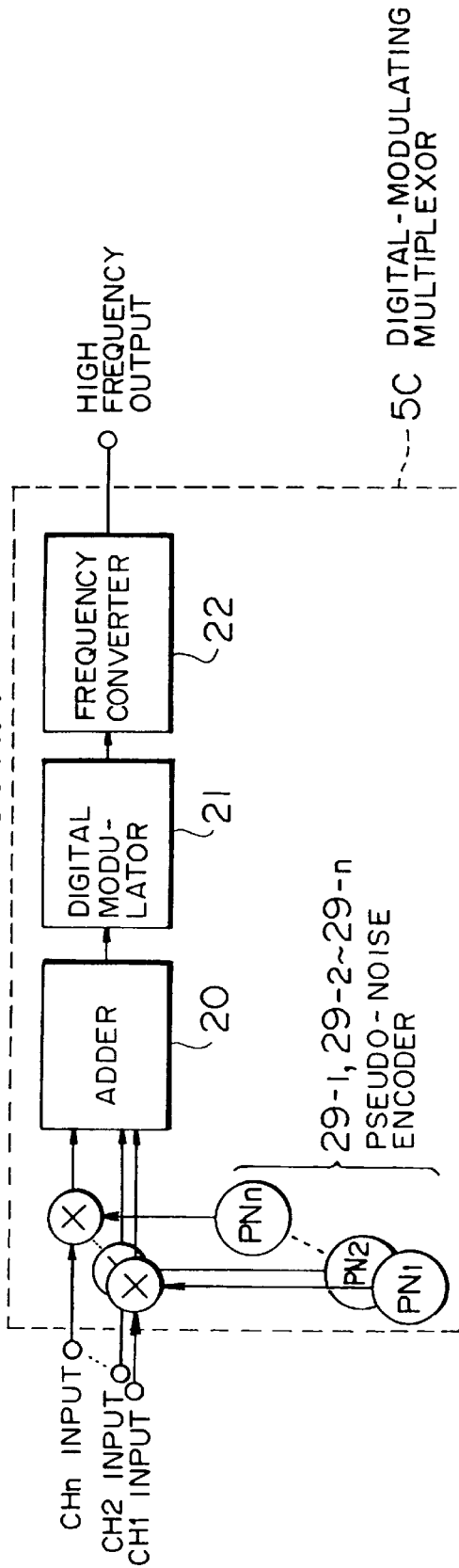
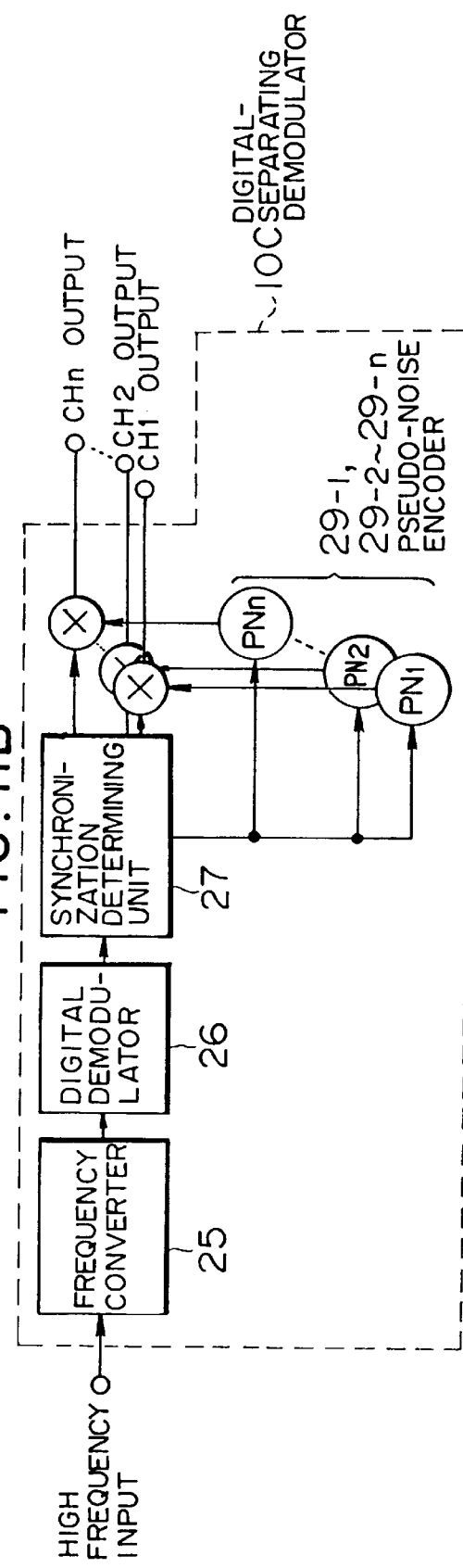

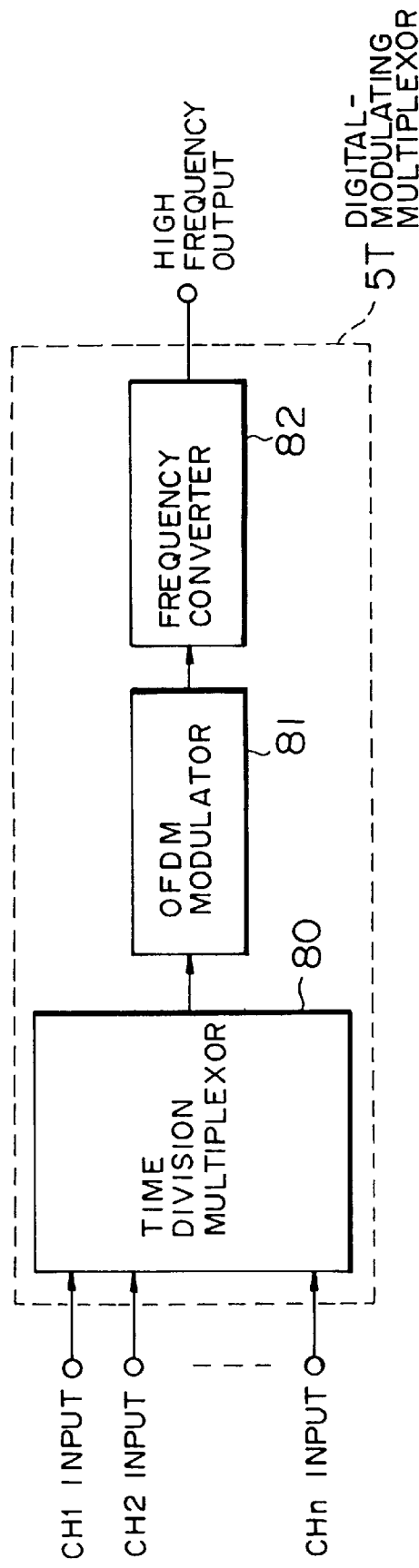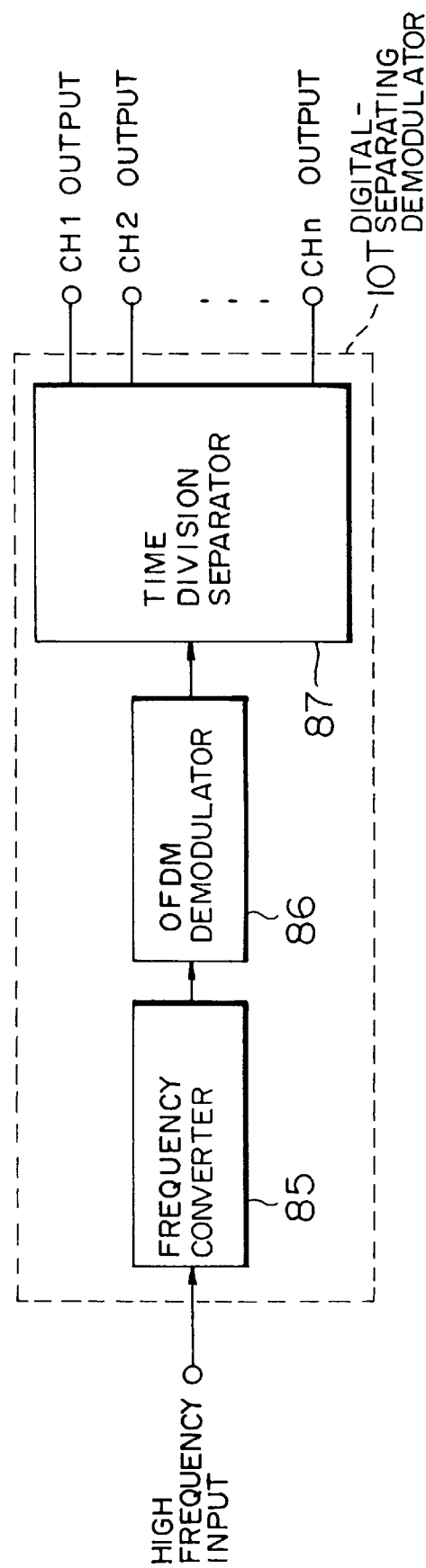

OPTICAL-SIGNAL TRANSMITTING APPARATUS, OPTICAL-SIGNAL RECEIVING APPARATUS, AND OPTICAL-SIGNAL TRANSMITTING AND RECEIVING SYSTEM

BACKGROUND OF THE INVENTION

1. Field of the Invention

The present invention relates to an optical-signal transmitting apparatus, an optical-signal receiving apparatus and an optical-signal transmitting and receiving system. More particularly, the invention relates to an optical-signal transmitting apparatus that scatters signal light to perform transmission, and an optical-signal receiving apparatus that receives the scattered light from the transmitting apparatus. The invention also relates to an optical-signal transmitting and receiving system that scatters signal light to transmit it and receives the scattered light.

2. Description of the Related Art

Hitherto, a light-emitting diode or a semiconductor laser having an oscillation wavelength of approximately 0.8 μm is usually employed as a light source for use in a Local Area Network (LAN) using optical space transmission (hereinafter simply referred to as "optical radio transmission") for indoor use. However, light sources of the above type present the following problems.

An explanation will first be given of the problems encountered when a light-emitting diode is used as a light source. The modulation frequency of the diode does not fall under a sufficiently high frequency band as is required for performing full-duplex transmission of moving pictures demanded by a multimedia environment. This imposes a restriction on the range of uses of the LAN using optical radio transmission. Moreover, a light-emitting diode which can modulate with a high frequency, for examples 30 MHz, produces an optical output as low as 10 mW whereby sufficient optical power cannot be obtained. It is thus necessary to use a plurality of light-emitting diodes in order to increase the optical output, which accordingly requires the formation of a larger signal transmitting apparatus.

On the other hand, when a semiconductor laser is used as a light source, a laser having an oscillation wavelength of approximately 0.8 μm is usually employed as a light source because of its availability. Because of a concern for the safety of the eyes, as will be described below, a semiconductor laser has a limited maximum permissible exposure (MPE) and thus cannot exhibit sufficient optical power in an oscillation wavelength of approximately 0.8 μm for its application to the LAN using optical radio transmission. This problem is particularly noticeable when a scattered light signal is used.

Additionally, a wavelength of approximately 0.8 μm of a semiconductor laser is in proximity to the major wavelength band of external waves of light emitted from a fluorescent lamp, an incandescent lamp or sunlight incident indoors, thereby easily causing leakage of noise from the above lights. It is thus necessary to provide a narrow-band filter (interference filter) which allows signals having a wavelength strictly coinciding with the wavelength of a semiconductor laser to pass therethrough in order to increase the signal to noise (S/N) ratio of a receiving signal. This incurs an increase in the costs.

SUMMARY OF THE INVENTION

Accordingly, it is an object of the present invention to provide an optical-signal transmitting apparatus which uses a light source exhibiting a large amount of optical power while ensuring the safety of the eyes to construct a LAN using optical radio transmission and thus implements multichannel transmission through the use of scattered light signals, which is conventionally difficult to achieve, and further improves distribution in transmission characteristics caused by multiple reflection, which would otherwise cause a problem when transmission is conducted at a high bit rate.

In order to achieve the above objects according to the present invention, there is provided an optical-signal transmitting apparatus comprising: modulation means for performing predetermined digital modulation on a digital signal to be transmitted; light-emitting means for converting the digital signal modulated by the modulation means into a light signal and outputting it; and scattering means for scattering the light signal output from the light-emitting means and radiating it to external space.

The light-emitting means may emit light having the major wavelength in a range from 1.4 μm to 1.6 μm. Also, for eliminating communication interference caused by multiple reflection, the modulation means may perform modulation based on the duration of a symbol which is a unit forming a transmitting signal in such a manner to obtain not less than a predetermined ratio of a carrier wave to an interference wave (C/I) in a receiving end.

Further, in optical-signal communications having a plurality of channels, one of the following methods may be employed to perform a multiplexing operation: varying carrier frequencies in the respective channels; avoiding an overlapping of the signals in the respective channels on the time axis; and using different codes for digital signals in the respective channels.

The light signal emitting from the light-emitting device is scattered. This makes it possible to construct a LAN through the use of optical radio transmission while ensuring the safety of the eyes.

A light-emitting device emitting light having the major wavelength in a range from 1.4 μm to 1.6 μm is employed as a light source, thereby enabling optical radio communications exhibiting high optical power while ensuring the safety of the eyes. The frequency band from 1.4 μm to 1.6 μm greatly differs from the emission spectrum of a fluorescent lamp, and is also one fifth or less of the peak spectrum of sunlight. This achieves easy configuration of a filter for separating the signal light from interfering light, thereby enabling a reduction in costs.

Further, for eliminating communication interference due to multiple reflection, modulation is performed based on the duration of a symbol which is a unit forming a transmitting signal in such a manner so as to obtain not less than a predetermined ratio of a carrier wave to an interference wave (C/I) in a receiving end, for example, modulation is performed according to an Orthogonal Frequency Division Multiplex (OFDM) method. Hence, it is possible to prevent communication interference caused by optical multiplex reflection.

Additionally, in optical-signal communications having a plurality of channels, one of the following methods is employed varying carrier frequencies in the respective channels; avoiding the overlapping of the signals in the respective channels on the time axis; and using different codes for the digital signals in the respective channels. As a result, transmitting digital signals in a plurality of channels can be multiplexed in a single optical system, thereby achieving multichannel communications.

BRIEF DESCRIPTION OF THE DRAWINGS

FIG. 6 illustrates a unit for receiving scattered light.

FIG. 7 is a block diagram illustrating a Quadrature Amplitude Modulation (QAM) method: FIG. 7A illustrates a QAM transmitting unit; and FIG. 7B illustrates a QAM receiving unit;

FIG. 8 is a block diagram illustrating an Orthogonal Frequency Division Multiplex (OFDM) methods FIG. 8A illustrates an OFDM transmitting unit; and FIG. 8B illustrates an OFDM receiving unit;

FIG. 9 is a block diagram illustrating a Frequency Division Multiplex (FDM) method: FIG. 9A illustrates a FDM transmitting unit; and FIG. 9B illustrates a FDM receiving unit;

FIG. 10 is a block diagram illustrating a combined method for modulating signals in a plurality of channels according to the OFDM method and for multiplexing the signals according to the FDM method.

FIG. 11 is a block diagram illustrating a frequency spread spectrum method: FIG. 11A illustrates a transmitting unit; and FIG. 11B illustrates a receiving unit;

FIG. 13 is a block diagram illustrating a combined method for modulating signals in a plurality of channels according to the OFDM method and for multiplexing the signals according to the TDM method: FIG. 13A illustrates a transmitting unit; and FIG. 13B illustrates a receiving unit.

DESCRIPTION OF THE PREFERRED EMBODIMENTS

Embodiments of the present invention will now be described with reference to FIGS. 1 to 13.

Figure 1:
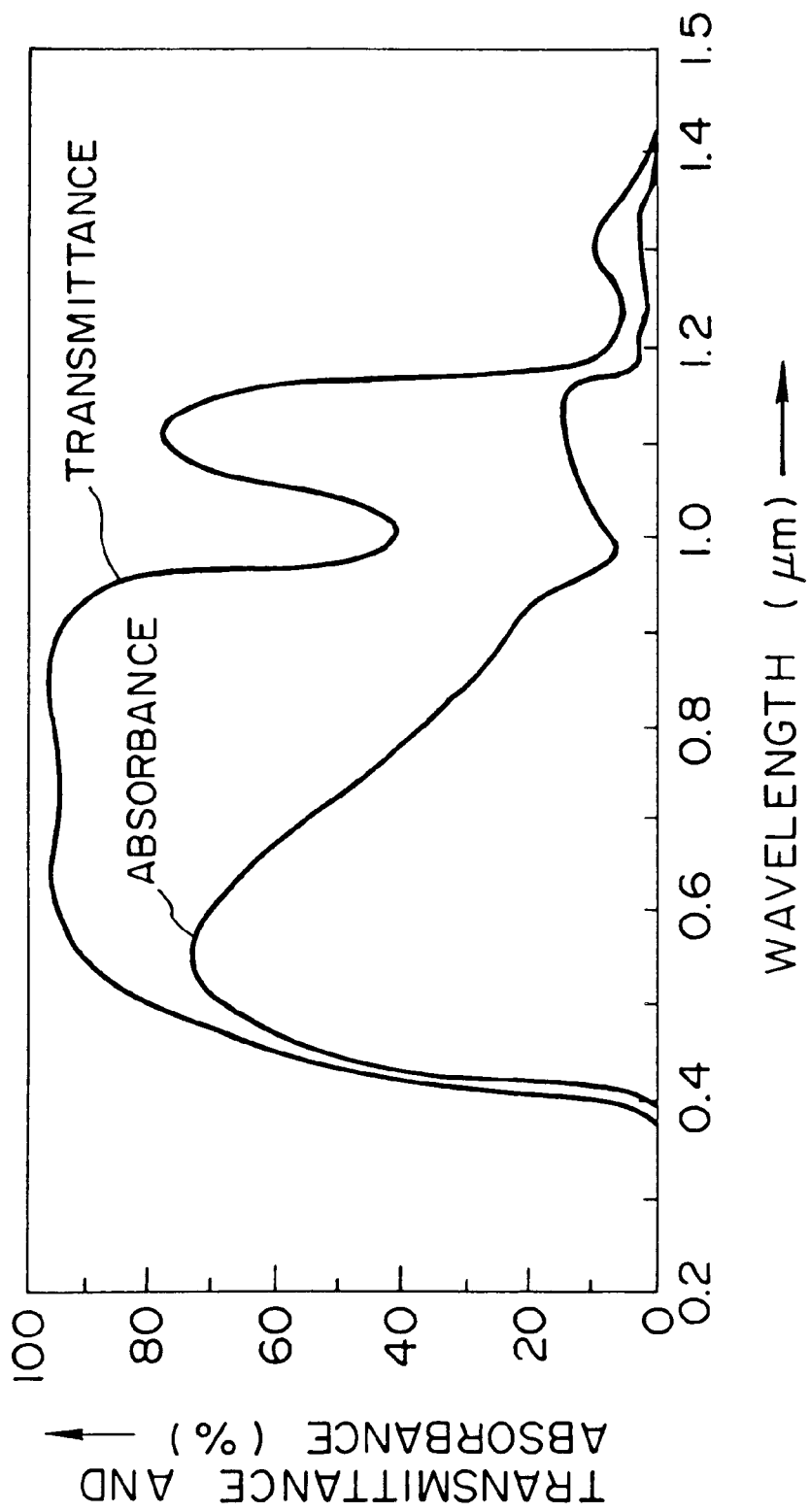
FIG. 1 shows the relationship of the wavelengths to the transmittance of light entering from the cornea of the eyes and travelling to the back of the eyes and also shows the relationship of the wavelengths to the absorbance of the back of the eyes with respect to light.

A reference will first be made to FIG. 1 to explain influences produced upon the eyes by optical wavelengths. FIG. 1 illustrates the relationship of the wavelengths to the transmittance of light which enters from the cornea and travels to the back of the eyes, and also shows the relationship of the wavelengths to the absorbance of the back of the eyes with respect to the lights both the transmittance and the absorbance being shown relative to those at the cornea. A figure indicating the transmittance of light similar to FIG. 1 is given in SPIE Vol. 972 *Infrared Technology XIV* P328 FIG. 2, 1988. FIG. 1 shows that ultraviolet radiation (a wavelength of 0.4 μm or shorter) and far-infrared radiation having a wavelength higher than 1.4 μm are absorbed before reaching the back of the eyes. On the other hand, the cornea and the crystalline lens have high transmittance with respect to visible light and near-infrared radiation having a wavelength of approximately from 0.04 μm to 1.02 μm, exerting an extremely high degree of light intensity at the back of the eyes per unit area due to the converging action of the crystalline lens. It can also be seen from FIG. 1 that absorbance at the back of the eyes is high with respect to blue-color light (a wavelength of from 0.4 to 0.5 μm); but becomes lower as the wavelength gets longer. Even though light having longer wavelengths reaches the back of the eyes, the absolute amount of energy absorbed is minimal.

In view of the above background, the maximum permissible exposure (MPE) with respect to laser wavelengths is specified in International Electrical Commission (IEC) 825, considering safety of the eyes. For example, the MPE allowed when a semiconductor laser having a wavelength of from 1.4 μm to 1.6 μm is directly exposed to the eyes for a long time is 1000 W/m$^2$. This exposure is much greater than that of a known commonly-used laser having a wavelength of 0.8 μm, i.e., 5.1 W/m$^2$. Accordingly, light having the above-described wavelength band from 1.4 μm to 1.6 μm is preferably used for optical radio transmission so that exposure can be continued for a long time while exhibiting a large quantity of optical power.

Further, the frequency band of the wavelength from 1.4 μm to 1.6 μm differs greatly from the emission spectrum of a fluorescent lamp, and is also one fifth or less of the peak spectrum of sunlight. This allows easy configuration of a filter for separating the signal light from interfering light, thereby enabling a reduction in costs.

First Embodiment (indoor-use optical space transmission utilizing non-reflected light)

Figure 2:
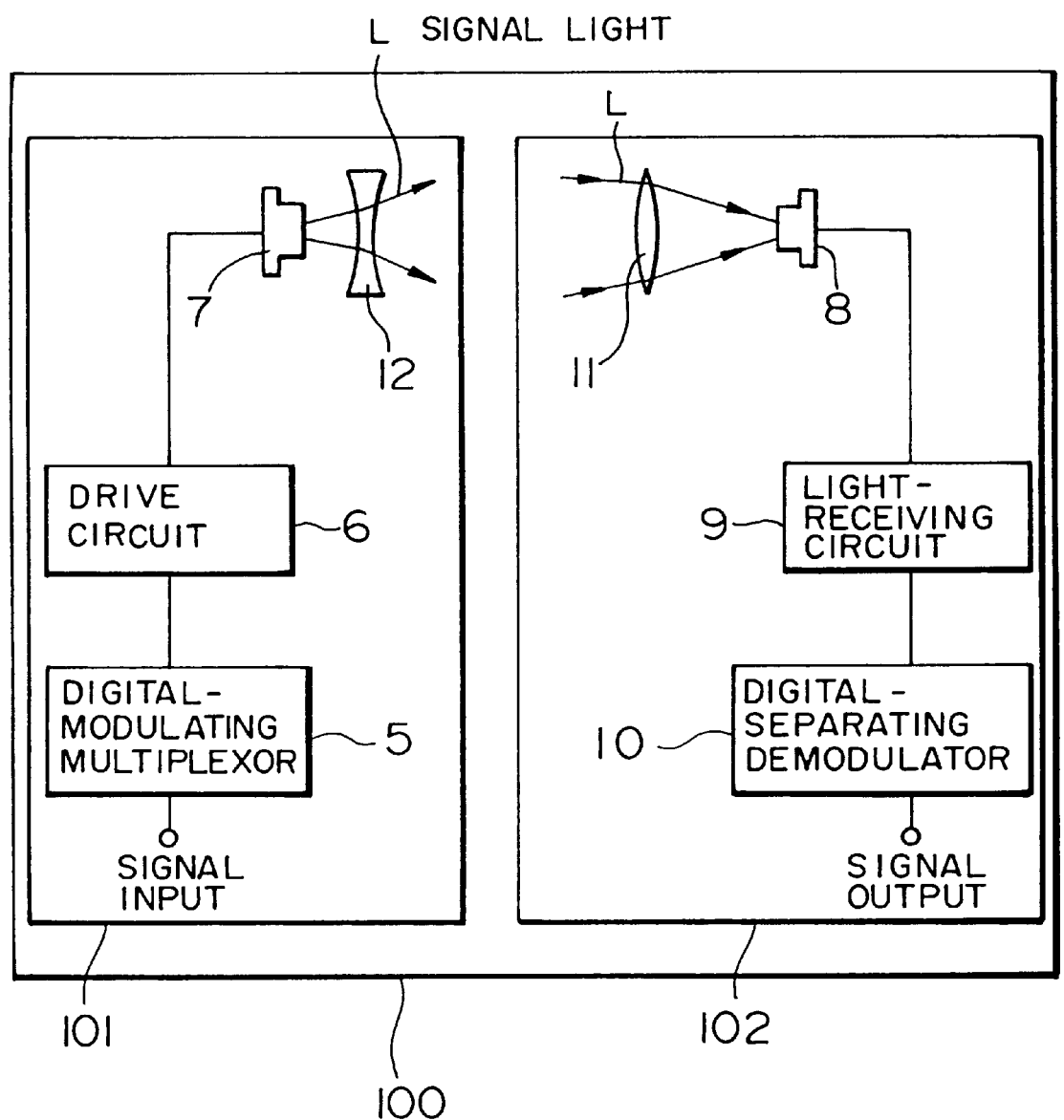
FIG. 2 is a block diagram of the construction of an indoor-use optical space transmitting and receiving system with the use of a method for receiving non-reflected light according to a first embodiment of the present invention.
Figure 3:
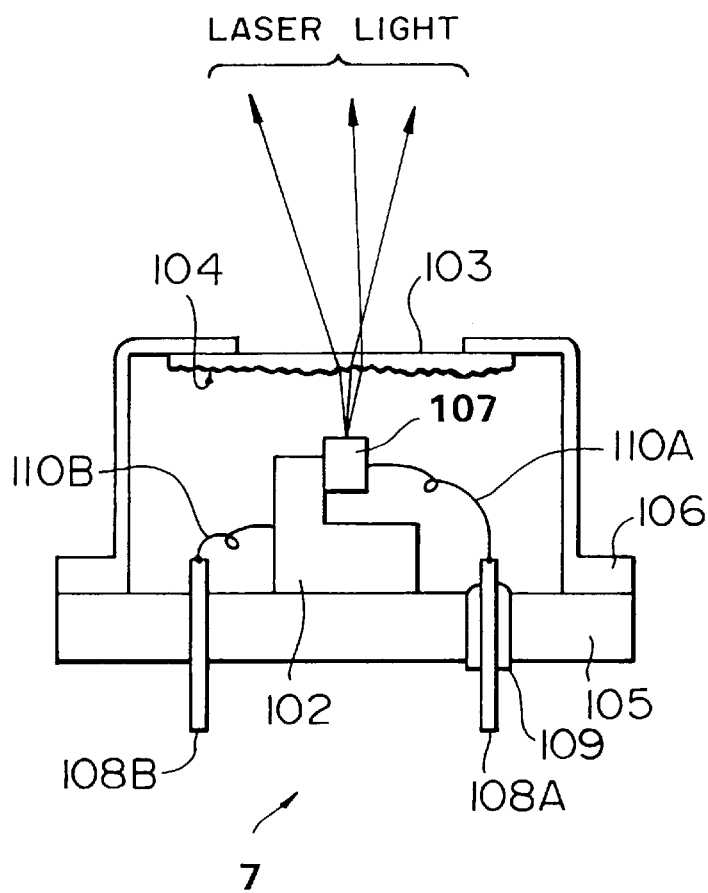
FIG. 3 is a schematic sectional view of an example of a light source for use in the first embodiment.
Figure 4:
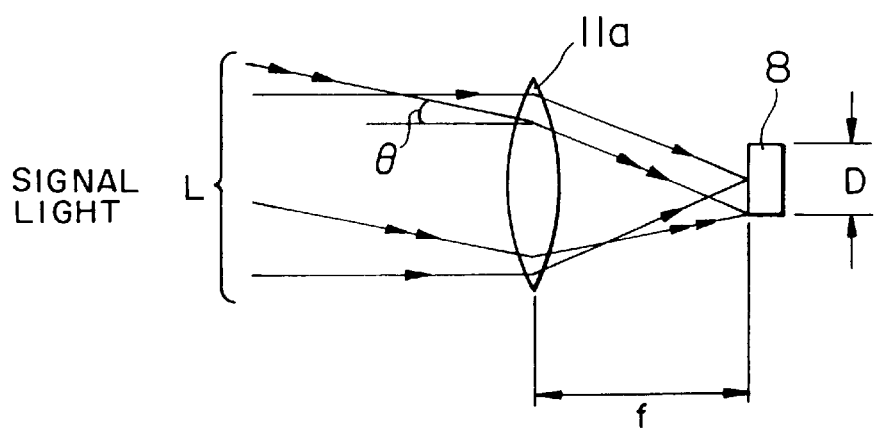
FIG. 4 illustrates the angle of acceptance obtained when the light is directly received.

Referring to FIGS. 2 to 4, an explanation will be given of an optical space transmitting and receiving system 100 for indoor use that uses as a light source a light-emitting device emitting a light having the major wavelength in a range from 1.4 μm to 1.6 μm and receives non-reflected light from the light-emitting device to achieve communications. A light-emitting diode or a semiconductor laser is used as the light emitting device by way of example.

The indoor-use optical space transmitting and receiving system 100 comprises a transmitting unit 101 and a receiving unit 102. The transmitting unit 101 further includes a digital modulating multiplexor 5, a drive circuit 6, a light-emitting device 7 and a transmitting optical system 12. On the other hand, the receiving unit 102 has a receiving optical system 11, a light-receiving device 8, a light-receiving circuit 9 and a digital separating (demultiplexing) demodulator 10. Digital signals in a plurality of channels are modulated and multiplexed by the digital modulating multiplexor 5 of the transmitting unit 101, and then, the drive circuit 6 drives the light-emitting device 7 in accordance with the modulated signal. The modulated light is then radiated as signal light L toward the light receiving unit 102. Further, the light is converged into the light-receiving device 8 of the receiving unit 11 by means of the receiving system 11 of the receiving unit 102 and is transformed to an electric signal, which is then amplified and subjected to waveform shaping in the light receiving circuit 9. Thereafter, the signal is divided (demultiplexed) channel by channel and demodulated in the digital separating (demultiplexing) demodulator 10. In this manner, the transmitted digital signal can be reproduced.

An explanation will now be given of a light source for use in the optical space transmitting and receiving system 100. As has been discussed above, when light is directly employed as a means of communication, the maximum permissible exposure (MPE) with respect to the wavelength is restricted for the safety of the eyes. In this invention, by use of light having a wavelength in a range from 1.4 µm to 1.6 µm, an extremely large quantity of optical power can be employed even though it is restricted by the MPE, as will be described below.

In compliance with IEC825, the MPE of a light source in a range from 1.4 µm to 1.6 µm is limited to 1000 W/m² when the exposure operation continues for a long time. This allowance is approximately 200 times as large as the MPE, 5.1 W/m², imposed on the commonly-used conventional light source having a wavelength of 0.8 µm. Accordingly, if light is radiated, for example, from the entire plane of a lens having a diameter of 5 cm and an area of 0.00196 m², the maximum radiation power exhibited from this lens in compliance with the current safety rules can be calculated as 1.96 W in a wavelength from 1.4 µm to 1.6 µm. Accordingly, a far larger amount of optical power is usable compared to a maximum optical power of as low as 9.8 mW resulting when light having a wavelength of 0.8 µm is radiated. Further, it has been reported that the transmission losses of the light entering the retina in a wavelength from 1.4 µm to 1.6 µm are approximately 100,000 times as large as the visible light (SPIE Vol. 972 *Infrared Technology XIV* P328, 1988). This also proves that a larger quantity of optical power can be expected from light having a wavelength from 1.4 µm to 1.6 µm than light having a wavelength of 0.8 µm, while considering the safety of the eyes.

For a further concern for the safety of the eyes exposed to light exhibiting such a larger amount of optical power, the following type of light source is employed: a light source that can be changed to a scattering state at the time when the light from the light-emitting device 7 is radiated to free space. The "scattering state" described herein refers to an irregularly-disordered state on the optical wave surface resulting from the fact that the light strikes particles or matter and changes its travelling direction. One example of such light sources is a semiconductor laser apparatus 200 shown in FIG. 3.

The semiconductor laser apparatus 200 is preferably constructed, as illustrated in FIG. 3, including a semiconductor laser device 107. The semiconductor laser device 7 is securely mounted on a mounting base 102 with one surface having an electrode in contact with the base 102. The mounting base 102 is further fixed on a casing base 105 in such a manner that the semiconductor laser device 107 can be substantially located in a central portion of the casing base 105. An electrode 108A is fit into and through the casing base 105 across an insulating member 109, while an electrode 108B is directly fit into and through the casing base 105, with both the electrodes 108A and 108B supplying drive signals to the semiconductor laser device 101 through lead wires 110A and 110B, respectively. Additionally, a cap 1.6is mounted on the casing base 105 to seal the semiconductor laser device 7 and other components. A sealing member 103 is disposed at the center of the cap 106 to function as an exit window for the laser light.

The sealing member 103 is formed of, at least, a material that can transmit a infrared ray having an wavelength from 1.4 µm to 1.6 µm. The inner surface of the sealing member 103 serves as a light-scattering surface 104 on which laser light passing through the sealing member 103 can be changed to a scattering state. The scattering surface 104 may be formed on the outer surface of the sealing member 103, or alternatively, the scattering surfaces 104 may be formed on both the inner and outer surfaces of the member 103.

A silicon plate may be preferably used for the sealing member 103 because it can transmit light having a wavelength of 1 µm or longer and can easily form the scattering surface 104 thereon by the use of an etching technique. It should be noted that the degree of scattering state, i.e., to what extent the wave surface of the scattering light is disturbed, is determined by considering environmental conditions for the light source and the safety of the eyes. In accordance with the degree of the disorder, uneven scattering surface 104 having an irregular size and interval is formed on the silicon place. Alternatively, a hologram plate may be used for the sealing member 103. A hologram plate has been provided with a pattern to generate an infrared ray whose optical wave surface is disturbed when laser light in the infrared-ray band emitting from the semiconductor laser device 101 is applied to the pattern. The formation of the hologram plate should also be made taking the degree of the scattering state into account.

A description will now be given with reference to FIG. 4 of the angle of acceptance obtained when non-reflected light is received. Based on this angle of acceptance, a method for selecting the light-receiving device 8 and a lens 11a constituting the receiving optical system 11 will now be described.

The diameter of the light-receiving device 8 shall be indicated by D, and the focal length of the lens 11a shall be represented by f. The angle θ equivalent to one half of the entire angle of acceptance can thus be indicated by D/(2f) [rad], the whole angle of acceptance thus resulting in D/f [rad]. It can be considered, therefore, for enlarging the angle of acceptance, that the focal length f of the lens 11a be decreased and the diameter D of the light-receiving device 8 be increased. The diameter of the lens 11a is desirably made larger with a view to increasing the converging power, which on the other hand, enlarges the overall receiving apparatus. Also, a lens of a larger size, in general, increases the focal length, thus decreasing the angle of acceptance. Additionally, a larger diameter of the light-receiving device 8 increases the parasitic capacitance, thus disadvantageously encouraging a response frequency to be lower. Hence, the angle of acceptance obtained when non-reflected light is received should be determined considering the characteristics of the lens 11a and the light-receiving device 8.

Second Embodiment (indoor-use optical space transmission utilizing reflected light)

Figure 5:
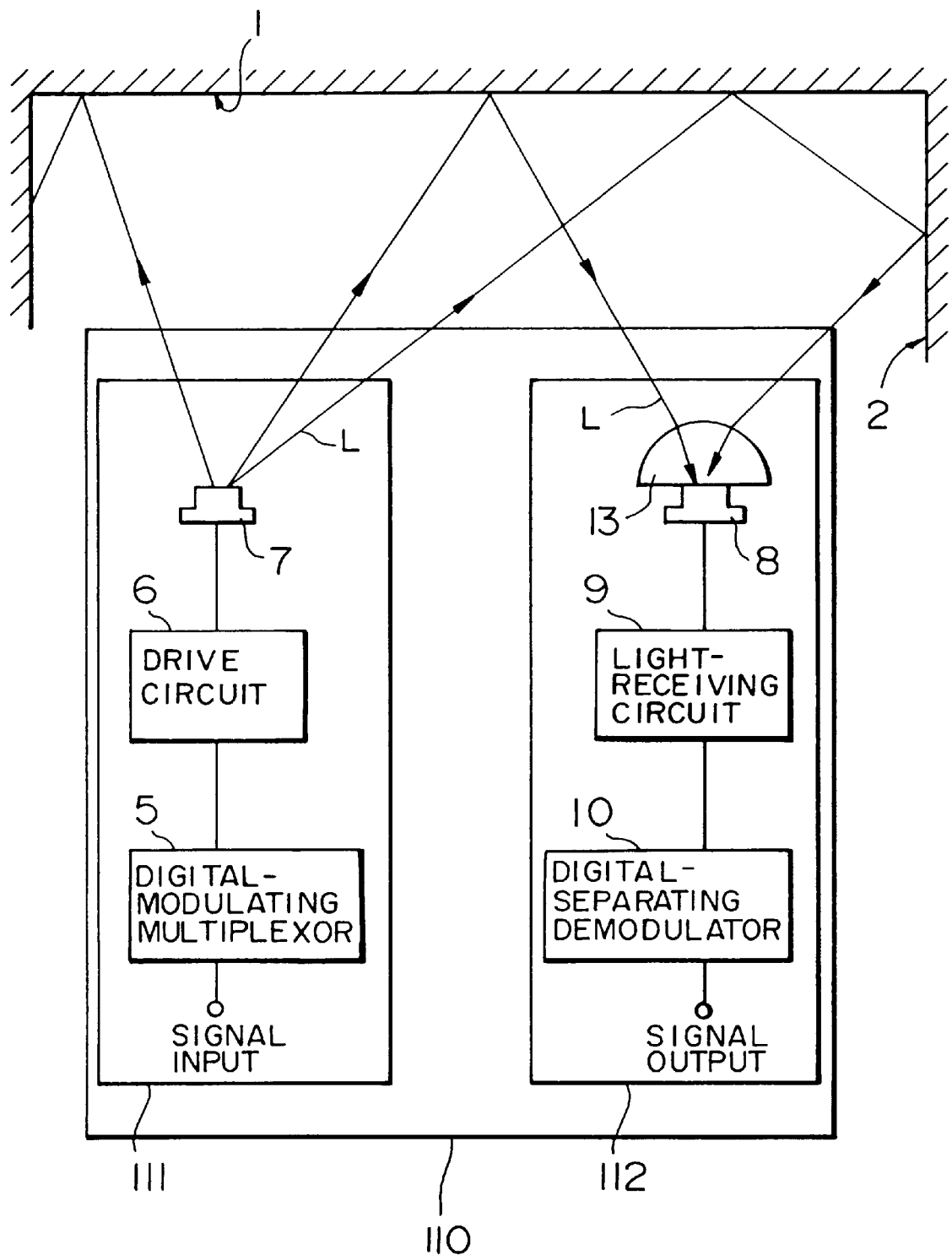
FIG. 5 is a block diagram of the configuration of an indoor-use optical space transmitting and receiving system with the use of a method for receiving reflected light according to a second embodiment of the present invention.

An indoor-use optical space transmitting and receiving system of a second embodiment will now be explained with reference to FIGS. 5 and 6. Although this embodiment is constructed of a transmitting unit 111 and a receiving unit 112, it differs from the first embodiment in that reflected light, that is, light reflected and scattered by an external structure, is employed for transmission. The elements of this embodiment other than the optical systems provided for the light-emitting device 7 and the light-receiving device 8, respectively, are similar to those of the first embodiment, and an explanation thereof will thus be omitted.

This embodiment is constructed in such a manner that signal light L radiated from the light-emitting device 7 of the transmitting unit 111 is first reflected on an indoor structure, such as a ceiling 1, a wall 2 or the like, and is then received by the light-receiving device 8 of the receiving unit 112. The ceiling 1, the wall 2 or the like is adapted to reflect and scatter the light on its surface, whereby the wave surface of the reflected light is disturbed to ensure the safety of the eyes in the optical radio transmission. Ordinary ceilings and walls, which are non-specular, have sufficiently satisfactory light scattering characteristics even though they are not constructed in a specific manner as described above.

In this embodiment constructed as described above, the light source uses the light-emitting device shown in FIG. 3 emitting light having a wavelength from 1.4 μm to 1.6 μm, as employed in the first embodiment, to emit transmitting light that is changed to a scattering state by reflecting on the scattering surface 104 provided for the sealing member 103. In place of the above type of light-emitting device, it is possible to employ a light-emitting device having a sealing member 103 without a scattering surface 104, since the light radiated from the light-emitting device can be changed to a scattering state by reflecting on a ceiling a wall or the like.

Figure 6A:
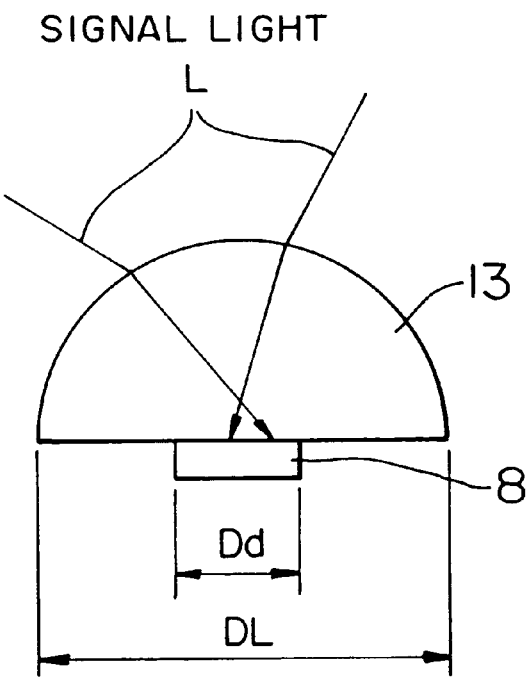
FIG. 6A illustrates a unit using a hemispherical lens.

An explanation will now be given of a method for converging signal light L into the light-receiving device 8 with reference to FIGS. 6A & 6B. A reference will first be made to FIG. 6A in which a hemispherical lens 13 is intimately mounted on the light-receiving device 8. The light incident on the hemispherical lens 13 is refracted and enters the light-receiving device 8. A larger hemispherical lens 13 is preferably used for converging a greater amount of light, which accordingly requires a larger light-receiving device 8. This further increases the parasitic capacitance, reducing the frequency response characteristics. It is thus necessary to determine the sizes of the hemispherical lens 13 and the light-receiving device 8 depending on the conditions for use of the apparatus. The antenna gain between the hemispherical lens 13 and the light-receiving device 8 is saturated when the diameter ratio DL/Dd of the diameter (DL) of the hemispherical lens 13 to the diameter (Dd) of the light-receiving device 8 is approximately 3. Accordingly, the diameters DL and Dd are preferably determined while satisfying a condition of DL/Dd$\geq$3.

Figure 6B:
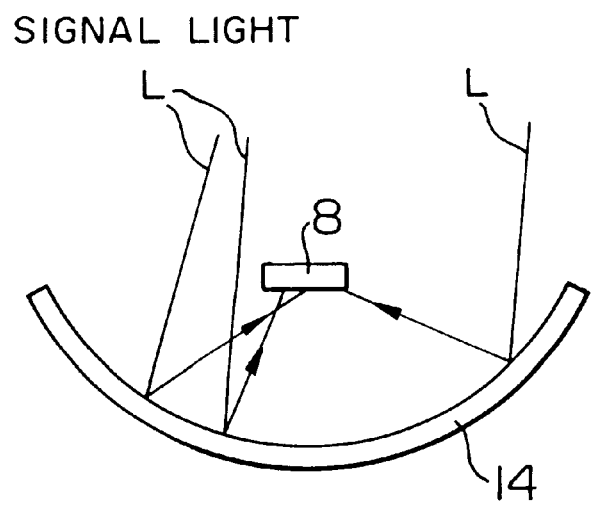
FIG. 6B illustrates a unit utilizing a parabolic lens.

FIG. 6B shows another method of converging the signal light L with the use of a parabolic mirror 14 in which the light-receiving device 8 is located in the position of the focal point of the parabolic mirror 14. Although the light impinging on the front face of the parabolic mirror 14 is normally converged into the focal point of the mirror 14, light incident at a certain angle is converged into a position slightly deviated from the focal point of the mirror 14. Accordingly, a larger light-receiving device 8 is required to sufficiently converge a larger quantity of light incident at a wider angle. This lowers the frequency response characteristics, as previously discussed. In this method, therefore, as well as the previous method, the size of the light-receiving device 8 should be determined depending on the conditions for use. The above-described methods are not exclusive as converging means, and other methods exhibiting similar advantages may be used.

Measures against multipath effect

An explanation will further be given of a method for applying digital multilevel modulation to a transmitting digital signal with a view to avoiding distribution of transmission characteristics caused by the multipath effect due to optical multiple reflection, i.e., caused by a variation in transmitting the multipath delay of reflected light in different transmission paths through which signal light L travels to the receiving unit 112 from the transmitting unit 111. The application of digital multilevel modulation makes it possible to lengthen the duration of a symbol, thereby relaxing the adverse influences of the delayed signal light caused by multiple reflection. The "symbol" specified herein refers to a unit forming a transmitting signal, in other words, a unit employed for modulating a transmitting digital signal.

A first method as a measure against the above-described multipath effect is a Quadrature Amplitude Modulation (QAM) method in which both amplitude modulation and phase modulation are performed. This method will now be explained with reference to FIGS. 7A & 7B.

FIG. 7A illustrates a digital modulating multiplexer 5 of a transmitting unit 111 according to the QAM method. In this unit, an input digital signal is coded in a convolutional manner in a convolutional-coding unit 40 for preventing burst errors, and based on this code, the signal is then grouped in a grouping unit 41 according to the value of the multilevel. It will now be assumed that the hexadecimal QAM (16QAM) method is employed. one point on the complex plane has four-bit information, since 16 is the fourth power of two, and thus, a digital signal stream is grouped into segments by a unit of four bits. The resulting digital signal stream is mapped on the complex plane by a mapping unit 42. During this mapping operation, transformation is performed according to what is referred to as a "gray coding system" in which adjacent codes are different from each other by only one bit. The resulting data on the complex plane is divided into an In Phase (I) signal and a Quadrature (Q) signal, which are then each converted to an analog signal in a digital/analog (D/A) converter 43. The I and Q signals are then input into an orthogonal modulator 44 and are modulated by being multiplied by two intermediate frequency (IF) carrier waves that are out of phase by $\pi/2$. Subsequently, the I and Q signals are added to generate an IF signal FIG. 7B illustrates a digital separating demodulator 10 of a receiving unit 112 according to the QAM method. The carrier wave component is extracted in a carrier-wave regenerator 51 from the IF signal which has been converted to a frequency for easy handling from the high-frequency signal input from the transmitting unit. 111 The carrier wave component is divided into a portion in phase with the component and a portion provided with a phase difference of $\pi/2$ in a 90-degree phase shifter 52. The two portions of the carrier wave component are multiplied by the IF signal and thus demodulated. Only the portions of the resulting signals in phase with the above respective portions of the carrier wave component are each extracted and converted to a digital signal in an analog/digital (A/D) converter 53. Afterwards, a symbol of each signal is determined in the complex plane in a symbol-value determining unit 54. The two signals are then synthesized in a synthesizer 55. The transmitted digital signal is thus obtained.

According to the above-described QAM method, for example, the 16QAM method, four bits are allocated to one symbol, whereby a signal can be transmitted at a rate of four bits per second/Hz. Accordingly, it is possible to transmit a signal at a symbol rate, which is one fourth of the basic digital signal for performing modulation, i.e., at a symbol period four times as long as the digital signal A second method as a measure against the multipath effect is an Orthogonal Frequency Division Multiplex (OFDM) method. In this method, not a single carrier wave, but a plurality of orthogonal carrier waves are used to transmit a digital signal The OFDM method will now be explained with reference to FIGS. 8A and 8B.

FIG. 8A is a block diagram of a digital modulating multiplexer 5 of a transmitting unit 111 according to the OFDM method. An input serial digital signal is converted into a parallel signal in a serial/parallel converter 60, thus resulting in a stream of a plurality of symbols at a lower rate. The number of carrier waves used in this OFDM method is determined by the bit number of parallel data, i.e, a unit for FFT processing A stream of lower-rate symbols is then subjected to inverse fast Fourier transformation (FFT) in an inverse fast Fourier transforming unit 61. Subsequently, the resulting stream of symbols is converted into a serial signal in a parallel/serial converter 62 and subjected to digital/analog conversion in a digital/analog (D/A) converter 63, followed by passing through a low-pass filter 64. An IF signal is thus generated FIG. 8B is a block diagram of a digital modulating demodulator 10 of a receiving unit 112 according to the OFDM method. In this demodulator 10, the transmitted digital signal can be reproduced by reversing the operation executed in the transmitting unit. The IF signal is first converted from an analog signal to a digital signal in an analog/digital (A/D) converter 71. The digital serial signal is then converted into a parallel signal in a serial/parallel converter 72 and is subjected to FFT processing in a FFT unit 73. Thereafter, the resulting signal is arranged in the time domain in a parallel/serial converter 74. The transmitted digital signal is thus obtained According to the above-discussed OFDM method, if inverse FFT processing, for example, using 1024 carrier waves, is employed, the symbol rate results in $\frac{1}{1024}$ of the data rate obtained when the data has been serially arranged prior to the inverse FFT processing. More specifically, when base data at 150 Mbaud rate is combined with 1024 carrier waves according to the OFDM method, the symbol rate of the base data drops by $\frac{1}{1024}$, i.e., to approximately 150 Kbaud rate, and the symbol period is increased to 6.7 $\mu$seconds, thereby enabling an extension of the symbol period.

An explanation will now be given of the relationship between the symbol period and the delay time of delayed reflected waves. In the event of the generation of multiple reflection in a transmission channel, the leading edge of the symbol of a delayed reflected wave overlaps the trailing edge of the previous symbol of the principle reflected wave, thus resulting in interference between the different symbols. In order to reduce the adverse influences of the multiple reflection, the symbol period should be lengthened. Namely, the ratio of the overlapping time of different symbols to the symbol period should be reduced.

It will now be assumed that a light signal is received from a path j. This signal may be formed of a component Cj contributing to signal reproduction and component Ij causing symbol interference. When multiple reflection occurs, the total ratio of carrier waves to interference waves can be schematically indicated by $C/I = \Sigma C_j / \Sigma I_j$ (j=1,2, ..., n), wherein the path j indicates 1,2, ..., n. The components Cj and Ij can be represented by functions of the delay time $\tau$ of the delayed reflected wave relative to the principle reflected wave and the symbol period T. Accordingly, the estimated maximum delay time $\tau$max is determined in consideration of a space in which the indoor-use optical space transmitting and receiving system is installed, thereby making it possible to calculate the symbol period T for obtaining a desired ratio of carrier waves to interference waves C/I.

A guard interval, i.e., a period in which FFT processing is not executed during demodulation, is provided at the leading edge or the trailing edge of each symbol, thereby enabling the formation a signal that is not easily vulnerable to the adverse influences of the multipath effect. For example, in a 10 square meter room, it takes 0.066 $\mu$second for light to travel between the 10 m lengths. Accordingly, a guard interval, approximately 0.1 $\mu$second between adjacent symbols, can significantly reduce the adverse effects of the reflected waves. In this embodiment, the symbol period is 6.7 $\mu$seconds, which is extended by 0.1 $\mu$second for a guard interval to result in the total period of 6.8 $\mu$seconds, thereby achieving high-speed digital indoor-use transmission without being seriously influenced by reflected waves by virtue of the use of the OFDM method.

Multichanneling method

A description will now be given with reference to FIGS. 9A to 11B of a method for ensuring a plurality of channels for the indoor-use optical space transmitting and receiving system of the present invention The "channel" specified herein refers to a single path for transmitting signals.

A first method, taking advantage of a difference in the frequency characteristics of a modulating signal, employs a Frequency Division Multiplex (FDM) method. In this methods different frequencies are allocated to the respective channels for use in, for examples television and radio broadcasting. Different subcarriers are employed as channels to avoid overlapping of frequency bands, whereby signals in a plurality of channels can be simultaneously transmitted through the use of a single optical system FIG. 9A is a block diagram of a digital modulating multiplexer 5F of a transmitting unit 111 according to the FDM method. The digital-modulating multiplexor 5F corresponds to the digital-modulating multiplexor 5 shown in FIG. 20 Digital signals input from a plurality of channels (CH1 to CHn) are each converted into an IF signal by a digital modulator 30. This digital modulator 30 is used by, for example, the QAM method described above. The respective modulating signals are frequency-converted by frequency converters (31-1 to 31-n) in such a manner that the frequency bands of the signals are not overlapped with each other. The resulting signals in the respective channels are added in a frequency division multiplexor 22, resulting in a multiplex signal.

FIG. 9B is a block diagram of a digital separating demodulator 10F of a receiving unit 112 used in the FDM method. The digital-separating (demultiplexing) demodulator 10F corresponds to the digital-separating (demultiplexing) demodulator 10 shown in FIG. 2. The multiplex receiving signal is divided into signals in the respective channels by allowing only the signals having an allocated frequency band to pass through a band pass filter of a frequency division separator 35. The resulting signals in the respective channels are subjected to frequency-conversion in frequency converters (36-1 to 36-n) and are then demodulated in digital demodulators 37, respectively. The transmitted signal is reproduced in this manner.

A description will now be given of a combined method of the OFDM method for modulating signals in a plurality of channels and the FDM method for multiplexing the signals in the respective channels. This combined method will now be explained with reference to FIG. 10. When the OFDM method is employed to modulate signals in a plurality of channels, signals are transmitted in a wider frequency bandwidth than the bandwidth actually required for transmitting information, thereby disadvantageously making the frequency band used in each channel wider. This would decrease the number of channels to be multiplexed in a restricted frequency band. It is thus necessary to narrow the frequency bandwidth occupied in each channel in order to multiplex as many channels as possible. This can be attained by the above-described QAM method. In this method, both amplitude modulation and phase modulation are performed, thereby making it possible to transmit the same amount of information in a narrower band.

Figure 10A:
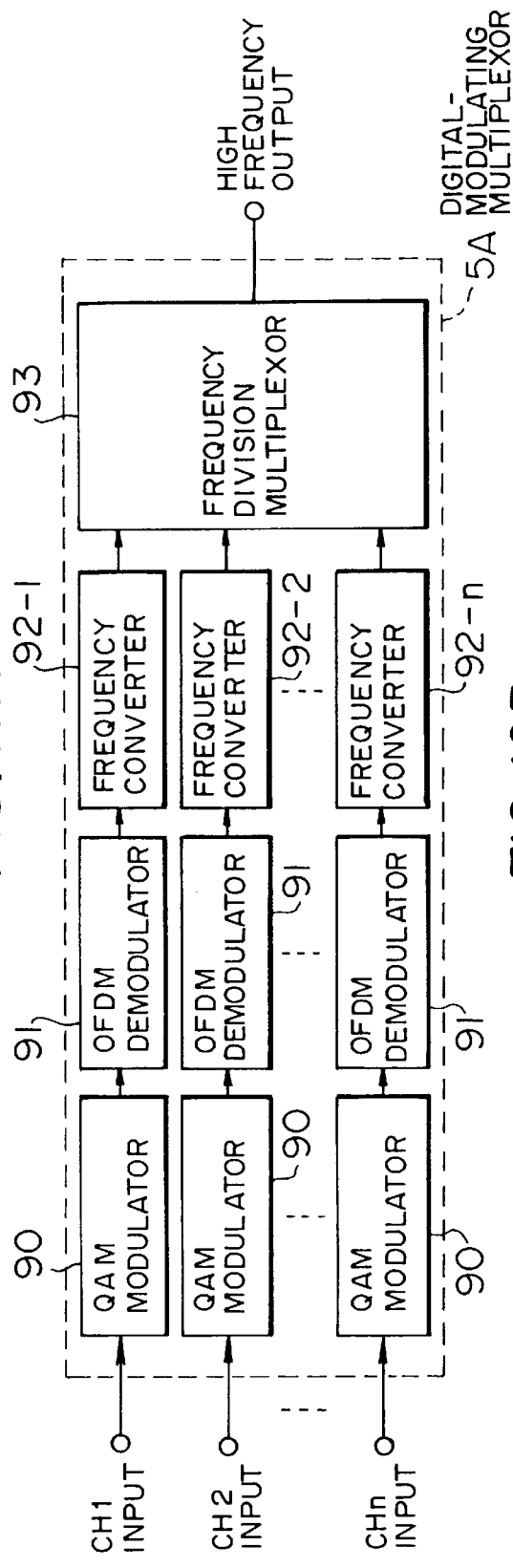
FIG. 10A illustrates a transmitting unit.

FIG. 10A illustrates a digital modulating multiplexer 5A of a transmitting unit. The digital-modulating multiplexor 5A corresponds to the digital-modulating multiplexor 5 shown in FIG. 20 Digital signals input from a plurality of channels (CH1 to CHn) are each QAM-modulated by a QAM modulator 90 so as to be converted into a signal having a narrower frequency bandwidth. The resulting QAM signals are each further modulated by an OFDM modulator 91 according to the OFDM methods thereby making it possible to perform more reliable modulation than a single use of the QAM method to inhibit the adverse influences of multiple reflection. Subsequently, the OFDM signals undergo frequency-conversion in frequency converters (31-1 to 31-n), respectively, in such a manner that the frequency bandwidths occupied in the respective channels are not overlapped with each others and then synthesized in a frequency division multiplexor 32. As a consequences a multiplex signal is acquired.

Figure 10B:
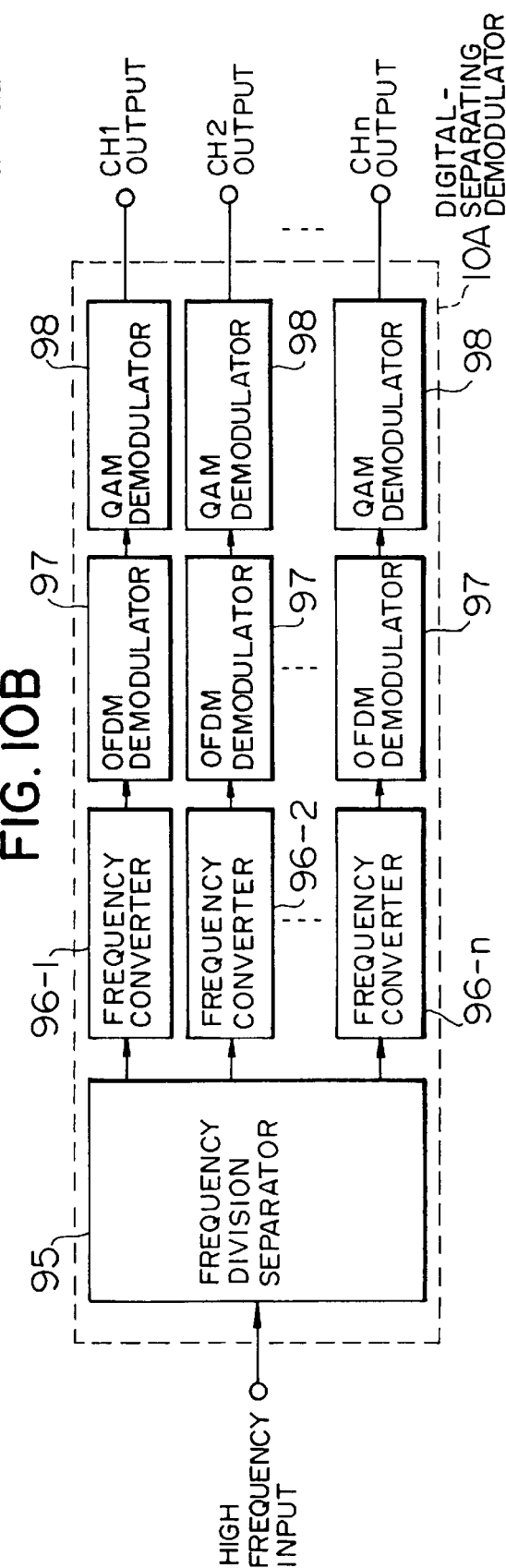
FIG. 10B illustrates a receiving unit.

FIG. 10B illustrates a digital separating demodulator of a receiving unit 112. The digital-separating (demultiplexing) demodulator 10A corresponds to the digital-separating (demultiplexing) demodulator 10 shown in FIG. 2. A high-frequency input is divided into signals in the respective channels in a frequency division separator 95, and the resulting signals are subjected to frequency-conversion in the respective frequency converters (96-1 to 96-n). The modulating signals are then each demodulated in an OFDM demodulator 97 and a QAM demodulator 98, whereby the transmitted digital signal can be reproduced.

Both the QAM modulation and the OFDM modulation are performed in a digital form This eliminates the need for D/A conversion and orthogonal conversion that would be normally required for performing QAM modulation, and it is only essential that the I and Q signals modulated by the QAM method are input into a series/parallel modulator according to the OFDM method. Similarly, during demodulation, there is no need for carrier-wave regeneration and A/D conversion that would be normally necessitated by the QAM demodulation A second method for ensuring a plurality of channels, utilizing a difference in coding characteristics of a modulating signal, is a Code Division Multiplex (CDM) method. This method will now be explained with reference to FIGS. 11A & 11B when using a spread spectrum system. In this embodiment, pseudo noise is used as a code for a spread spectrum system by way of example.

FIG. 11A is a block diagram of a digital modulator unit 5C of a transmitting unit 111 according to the CDM method utilizing the spread spectrum system. The digital-modulating multiplexor 5C corresponds to the digital-modulating multiplexor 5 shown in FIG. 2. In the multiplexer 5C, different codes for the respective channels (CH1 to CHn) are generated in pseudo-noise encoders (29-1 to 29-n), respectively, and digital signals to be transmitted in the respective channels are multiplied by the respective codes. The pseudo-noise encoders (29-1 to 29-n) generate pseudo-noise codes, for example M-series codes, having much higher speeds than the digital signals. Then, the coded digital signals are added in an adder 20 so that they can be multiplexed to be a single signal in the time domain. The multiplexed signal is modulated in a digital modulator 21 and combined with a carrier wave in a frequency converter 22. In this manner, the digital signal can be transmitted.

FIG. 11B is a block diagram of a digital separating demodulator 10C of a receiving unit 112 according to the CDM method utilizing the spread spectrum system. The digital-separating (demultiplexing) demodulator 10C corresponds to the digital-separating (demultiplexing) demodulator 10 shown in FIG. 2. In the demodulator 10C, the transmitted signal undergoes frequency-conversion in a frequency converter 25 and is then demodulated to a corresponding signal in the baseband in a digital demodulator 26. The demodulated signal is divided into signals in the respective channels, and the divided signals are multiplied with the use of the pseudo-noise encoders (29-1 to 29-n) in a synchronizing manner by the respective pseudo noise codes used for multiplying during transmission. The signals in the respective channels can thus be separated from each other. Since the pseudo-noise signals have a shorter period than the transmitting digital signals, the demodulated signals multiplied by the pseudo-noise signals are distributed in the frequency domain. Accordingly, the distributed signals are synthesized with the use of a determining unit 27, whereby the transmitted digital signal can be reproduced.

A third method for guaranteeing a plurality of channels, utilizing a time difference of modulating signals, is a Time Division Multiplex (TDM) method. In this method, digital signals in a plurality of channels are multiplexed in such a manner that they are not overlapped with each other in the time domain. This TDM method will now be explained with reference to FIG. 120

Figure 12:
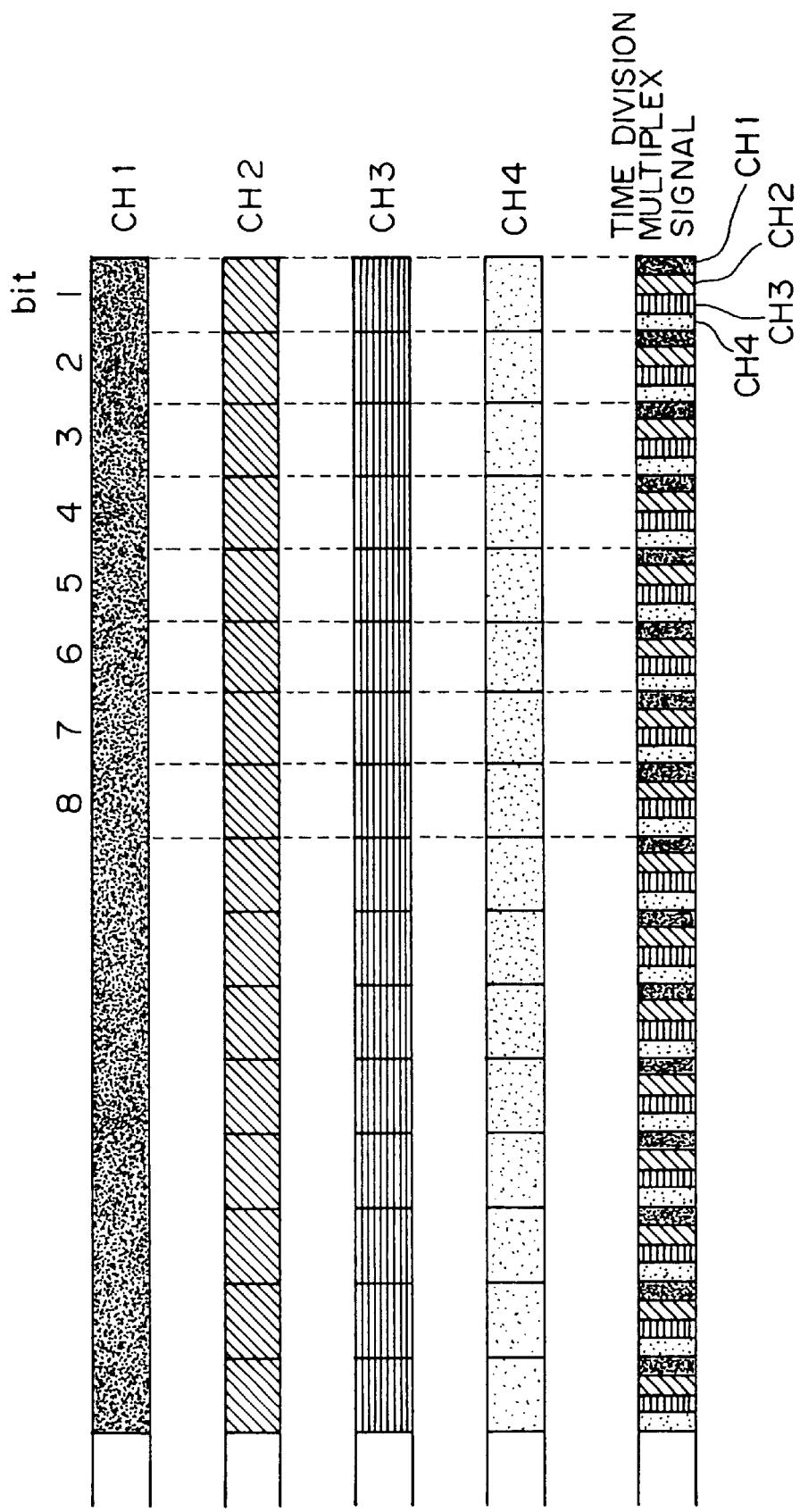
FIG. 12 illustrates a Time Division Multiplex (TDM) method.

In the transmitting unit 111, the pulse widths of digital signals in the respective channels are narrowed, and the position of the signals in the time domain are slightly displaced and consecutively joined to each other, thereby obtaining a multiplexed signal. For example, when digital signals in four channels are transmitted according to the TDM method, as illustrated in FIG. 12, the pulse width of the multiplexed signal is reduced to one fourth of the transmitting signal, and the digital signals of the respective channels are consecutively arranged by a unit of one bit. In the receiving unit 112, on the other hand, the multiplexed signal is divided and allocated to the respective channels in a synchronizing manner, thus making it possible to divide the multiplexed signal. Although the multiplexing method is performed by a unit of one bit in FIG. 12, it may be performed by a unit of a byte or a word.

Multiple reflection is, as has been discussed above, a high barrier against scattered light achieving optical radio communications According to the TDM method, since a plurality of channels are under control in the time domain, the delayed reflected light with a time lag caused by multiple reflection exerts a great influence on the principle reflected light. This problem can be solved by a combination of the TDM method and the OFDM method, thereby enabling multichanneling resistance to adverse influences of multiple reflection, as will be described below.

FIG. 13A is a block diagram of a digital modulating multiplexer 5T of a transmitting unit 111 for use in a combination of the TDM method and the OFDM method. The digital-modulating multiplexor 5T corresponds to the digital-modulating multiplexor 5 shown in FIG. 2. Digital signals input from a plurality of channels (CH1 to CHn) are multiplexed by a time division multiplexor 80 according to the above-described TDM method. The multiplexed signal is modulated in an OFDM modulator 81 according to the OFDM method and is combined with the carrier wave by a frequency converter 82.

FIG. 13B is a block diagram of a digital separating modulator 10T of a receiving unit 112 for use in the above combination method. A digital-separating (demultiplexing) demodulator 10T corresponds to the digital-separating (demultiplexing) demodulator 10 shown in FIG. 2. A high-frequency input is subjected to frequency-conversion in a frequency converter 85 and demodulated in an OFDM demodulator 86 according to the OFDM method. The demodulated signal is divided in a time division separator 87 and allocated to the respective channels.

According to the construction as described above, a plurality of channels are multiplexed according to the TDM method, and then, a multiplexed signal is modulated according to the OFDM method. This makes it possible to decrease the symbol rate and thus reduce the adverse influences of multiple reflection.

As will be clearly understood from the foregoing description, the present invention offers the following advantages.

A sufficient amount of optical power required for indoor-use optical radio communications can be output to free space, while ensuring safety of the eyes. A receiving unit is thus able to receive a larger amount of optical power than conventional receiving units, thereby ensuring a high S/N ratio and achieving a high quality transmission. Additionally, when a semiconductor laser, having an extremely high modulating frequency, is used, digital transmission and multichannel transmission in a wider frequency band can be attained.

A semiconductor laser having an oscillation wavelength of from 1.4 μm to 1.6 μm is used as a light source, and also, multilevel modulation is performed on a laser light signal. This sufficiently decreases the symbol rate of a transmitting signal and thus makes it possible to ignore the period during which the signal light may be disadvantageously reflected indoors and become interference light. With this construction, a LAN through the use of high-speed multi-channel optical radio transmission can be implemented

What is claimed is:

1. An optical-signal transmitting apparatus comprising:

modulation means for performing predetermined digital modulation on a digital signal to be transmitted;

light-emitting means for converting the digital signal modulated by said modulation means into a light signal and outputting it; and scattering means for scattering the light signal output from said light-emitting means and radiating it to external space, wherein said scattering means includes a scattering surface through which said light signal is transmitted before radiating into external space.

2. An optical-signal transmitting apparatus according to claim 1 wherein said light-emitting means emits light having the major wavelength in a range from 1.14 μm to 1.6 μm.

3. An optical-signal transmitting apparatus, comprising:

modulation means for performing predetermined digital modulation on a digital signal to be transmitted;

light-emitting means for converting the digital signal modulated by said modulation means into a light signal and outputting it; and scattering means for scattering the light signal output from said light-emitting means and radiating it to external space, wherein said light emitting means emits light having wavelengths in a range from 11.4 to 1.6 μm, and wherein said modulation means performs modulation based on the duration of a symbol having a period of at least 6.7 μseconds, said symbol being a unit forming a transmitting signal in such a manner so as to obtain not less than a predetermined ratio of a carrier wave to an interference wave (C/I) in a receiving end.

4. An optical-signal transmitting apparatus according to claim 2, wherein said modulation means performs digital modulation according to a Quadrature Amplitude Modulation (QAM) method.

5. An optical-signal transmitting apparatus according to claim 2, wherein said modulation means performs digital modulation according to an Orthogonal Frequency Division Multiplex (OFDM) method.

6. An optical-signal transmitting apparatus according to claim 5, wherein said modulation means comprises multiplexing means for multiplexing digital signals to be transmitted in a plurality of channels.

7. An optical signal transmitting apparatus, comprising:

modulation means for performing predetermined digital modulation on a digital signal to be transmitted;

light-emitting means for converting the digital signal modulated by said modulation means into a light signal and outputting it; and scattering means for scattering the light signal output from said light-emitting means and radiating it to external space, wherein said light-emitting means emits light having wavelengths in a range from 1.4 μm to 1.6 μm and said modulation means performs digital modulation according to an Orthogonal Frequency Division Multiplex (OFDM) method, and said modulation means comprises multiplexing means for multiplexing digital signals to be transmitted in a plurality of channels, and wherein said multiplexing means multiplexes the digital signals in the respective channels by varying carrier frequencies used in the respective channels.

8. An optical-signal transmitting apparatus according to claim 6, wherein said multiplexing means multiplexes the digital signals in the respective channels by avoiding the overlapping of the signals in the time domain.

9. An optical-signal transmitting apparatus, comprising:

modulation means for performing predetermined digital modulation on a digital signal to be transmitted;

light-emitting means for converting the digital signal modulated by said modulation means into a light signal and outputting it; and scattering means for scattering the light signal output from said light-emitting means and radiating it to external space, wherein said light-emitting means emits light having wavelengths in a range from 1.4 μm to 1.6 μm and said modulation means performs digital modulation according to an Orthogonal Frequency Division Multiplex (OFDM) method, and said modulation means comprises multiplexing means for multiplexing digital signals to be transmitted in a plurality of channels, and wherein said multiplexing means multiplexes the digital signals in the respective channels by allocating different codes to the respective channels.

10. An optical-signal transmitting apparatus, comprising:

modulation means for performing, predetermined digital modulation on a digital signal to be transmitted;

light-emitting means for converting the digital signal modulated by said modulation means into a light signal and outputting it; and scattering means for scattering the light signal output from said light-emitting means and radiating it to external space, wherein said light-emitting means emits light having wavelengths in a range from 1.4 μm to 1.6 μm, and wherein said modulation means comprises multiplexing means for multiplexing the digital signals in a plurality of channels by varying carrier frequencies in the respective channels, as well as for performing digital modulation by channel according to the QAM method and then performing digital modulation according to the OFDM method.

11. An optical-signal receiving apparatus comprising:

light-converging means for converging a scattered light signal having wavelengths in a range from 1.4 μm to 1.6 μm incident at a plurality of angles and for converting the light signal into an electric signal; and demodulation means for performing predetermined digital demodulation on the electric signal converged and converted by said light-converging means, wherein said light converging means includes a hemispherical lens mounted on a light receiving device.

12. An optical-signal transmitting and receiving system comprising:

modulation means for modulating a digital signal to be transmitted according to a predetermined digital modulation method;

light-emitting means for converting the signal modulated by said modulation means into a light signal and outputting it;

light-receiving means for receiving the light signal output to external space by said light-emitting means and scattered by an external scatterer; and demodulation means for demodulating the signal received by said light-receiving means according to a demodulation method corresponding to said predetermined digital modulation method, wherein said light emitting means includes a scattering surface through which said light signal is transmitted into external space and said light receiving means includes a hemispherical lens mounted on a light receiving device.

13. An optical-signal transmitting apparatus according to claim 6, wherein said light-emitting means emits light having the major wavelength in a range from 1.4 $\mu$m to 1.6 $\mu$m.

14. An optical-signal transmitting apparatus according to claim 9, wherein said light-emitting means emits light having the major wavelength in a range from 1.4 $\mu$m to 1.6 $\mu$m.

15. An optical-signal transmitting apparatus according to claim 10, wherein said light-emitting means emits light having the major wavelength in a range from 1.4 $\mu$m to 1.6 $\mu$m.

16. An optical-signal receiving apparatus according to claim 11, wherein the ratio of the diameter of the hemispherical lens and the width of the light receiving device is at least 3.

17. An optical signal transmitting apparatus, comprising:
   a modulator;
   means for converting a digital signal modulated by said modulator into a light signal;
   a scattering surface through which said light signal is transmitted before radiating into external space.

18. An optical signal transmitting apparatus according to claims 17, wherein said modulator performs modulation based on the duration of a symbol having a period of at least 6.7 $\mu$seconds.

19. An optical-signal transmitting apparatus according to claim 17, wherein said converting means emits light having a wavelength in a range from 1.4 $\mu$m to 1.6 $\mu$m.

20. An optical signal transmitting apparatus according to claim 17, wherein said modulator multiplexes said digital signal to be transmitted in a plurality of channels having varying carrier frequencies.

21. An optical signal transmitting apparatus according to claim 20, wherein said modulator performs digital modulation by channel according to the QAM method and also performs digital modulation according to the OFDM method.

22. An optical signal transmitting apparatus according to claim 17, wherein said modulator multiplexes said digital signal to be transmitted in a plurality of channels, each channel having a different code allocated to it.

23. An optical-signal transmitting apparatus according to claim 17, further comprising an optical signal receiving apparatus including:

a light receiving device;
   a hemispherical lens mounted on the light receiving device; and
   a demodulator.

24. An optical signal transmitting apparatus according to claim 23, wherein the ratio of the diameter of the hemispherical lens to the width of the light receiving device is at least 3.

25. An optical-signal receiving apparatus comprising:
   a light receiving device;
   a hemispherical lens mounted on the light receiving device; and
   a demodulator.

26. An optical signal receiving apparatus according to claim 25, wherein the ratio of the diameter of the hemispherical lens to the width of the light receiving device is at least 3.

27. An method for transmitting an optical signal, comprising:
   modulating a digital signal;
   converting said digital signal into a light signal; and
   transmitting said light signal through a scattering surface before radiating into external space.

28. The method of claim 27, wherein said modulating step includes the step of performing modulation based on the duration of a symbol having a period of at least 6.7 $\mu$seconds.

29. The method of claim 27, wherein said converting step includes the step of converting said digital signal into a light signal having a wavelength in a range from 1.4 $\mu$m to 1.6 $\mu$m.

30. The method of claim 27, further comprising the step of multiplexing said digital signal to be transmitted in a plurality of channels having varying carrier frequencies.

31. The method of claim 30, further comprising the steps of modulating by channel according to the QAM method and modulating by channel according to the OFDM method.

32. The method of claim 27, further comprising the steps of multiplexing said digital signal to be transmitted in a plurality of channels, and allocating a different code to each channel.

33. The method of claim 27, further comprising the steps of:
   converging said light signal through a hemispherical lens mounted to a light receiving device; and
   demodulating said light signal.

34. The method of claim 33, further comprising the step of selecting a diameter of said hemispherical lens and a width of said light receiving device to have a ratio of at least 3.

35. A method of receiving an optical signal, comprising the steps:
   converging said light signal through a hemispherical lens mounted to a light receiving device; and
   demodulating said light signal.

36. The method of claim 35, further comprising the step of selecting a diameter of said hemispherical lens and a width of said light receiving device to have a ratio of at least 3.

* * * * *